(12) United States Patent
Li et al.

(10) Patent No.: US 8,533,765 B2
(45) Date of Patent: Sep. 10, 2013

(54) ON DEMAND SYSTEM AND METHOD USING DYNAMIC BROADCAST SCHEDULING

(75) Inventors: Jun Li, Plainsboro, NJ (US); Charles Chuanming Wang, Jamison, PA (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 565 days.

(21) Appl. No.: 11/991,036

(22) PCT Filed: Aug. 26, 2005

(86) PCT No.: PCT/US2005/030498
§ 371 (c)(1),
(2), (4) Date: Feb. 26, 2008

(87) PCT Pub. No.: WO2007/024233
PCT Pub. Date: Mar. 1, 2007

(65) Prior Publication Data
US 2009/0144784 A1 Jun. 4, 2009

(51) Int. Cl.
*H04N 7/173* (2011.01)
(52) U.S. Cl.
USPC .......... 725/97; 725/89; 725/90; 725/94; 725/95; 725/100
(58) Field of Classification Search
None
See application file for complete search history.

(56) References Cited

U.S. PATENT DOCUMENTS

| | | | |
|---|---|---|---|
| 6,622,305 B1 | 9/2003 | Willard | |
| 6,697,331 B1 | 2/2004 | Riihinen et al. | |
| 6,701,528 B1 * | 3/2004 | Arsenault et al. | 725/89 |
| 6,738,972 B1 * | 5/2004 | Willard et al. | 718/103 |
| 7,111,316 B1 * | 9/2006 | Zahorjan et al. | 725/97 |
| 7,624,415 B1 * | 11/2009 | Zhang et al. | 725/95 |
| 7,698,724 B1 * | 4/2010 | Day | 725/97 |
| 2001/0013123 A1 * | 8/2001 | Freeman et al. | 725/34 |
| 2001/0021999 A1 | 9/2001 | Seifert | |
| 2002/0023267 A1 | 2/2002 | Hoang et al. | |

(Continued)

FOREIGN PATENT DOCUMENTS

| | | |
|---|---|---|
| CA | 2406715 | 12/2001 |
| CA | 2451901 | 2/2003 |

(Continued)

OTHER PUBLICATIONS

Waldvogel, M. et al: "Fuzzycast: Media Broadcasting for Multiple Asynchronous Receivers" Mar. 2001, XP002375074.

(Continued)

*Primary Examiner* — Jason J Chung
(74) *Attorney, Agent, or Firm* — Robert D. Shedd; Jorge Tony Villabon

(57) ABSTRACT

A system and method for broadcasting content includes a content provider which interfaces with one or more clients through a network. The content provider includes a scheduler responsive to requests for content from clients. The scheduler provides the content in blocks by making the blocks available to requesters by a plurality of streams wherein a subsequent requester accesses blocks from previous requester's streams complemented by a subset of blocks as a stream for this requester to complete an entire set of blocks for the subsequent requester. By manipulating the scheduler as a function of user requests, this system and method is able to provide a video on demand service at a fractional bandwidth usage of a conventional VOD system.

10 Claims, 5 Drawing Sheets

(56) References Cited

U.S. PATENT DOCUMENTS

| | | | |
|---|---|---|---|
| 2002/0095510 A1* | 7/2002 | Sie et al. | 709/231 |
| 2003/0037331 A1* | 2/2003 | Lee | 725/32 |
| 2003/0046032 A1* | 3/2003 | Puthiyedath | 702/188 |
| 2003/0101460 A1 | 5/2003 | Liu | |
| 2003/0221194 A1 | 11/2003 | Thaigarajan et al. | |
| 2009/0070842 A1 | 3/2009 | Corson | |

FOREIGN PATENT DOCUMENTS

| | | |
|---|---|---|
| CN | 1423869 | 6/2003 |
| JP | 2001-148831 | 5/2001 |
| JP | 200233509 | 11/2002 |
| JP | 200346975 | 2/2003 |
| JP | 2003524349 | 8/2003 |
| JP | 2004159231 | 6/2004 |
| KR | 20020015586 | 8/2000 |
| WO | WO2004051998 | 6/2004 |
| WO | WO2004082197 | 9/2004 |

OTHER PUBLICATIONS

Janakirman, R et al: "Fuzzycast: efficient video-on-demand over multicast" Jun. 23, 2002, XP010593655.

Search Report dated Mar. 30, 2006.

* cited by examiner

ON DEMAND SYSTEM AND METHOD USING DYNAMIC BROADCAST SCHEDULING

This application claims the benefit, under 35 U.S.C. §365 of International Application PCT/US05/030498, filed Aug. 26, 2005, which was published in accordance with PCT Article 21(2) on Mar. 1, 2007 in English.

FIELD OF THE INVENTION

The present invention generally relates to on demand content broadcasting and delivery and, more particularly, to systems and methods for dynamically setting a broadcast schedule based on customers requests or feedback.

BACKGROUND OF THE INVENTION

Video on demand systems provide video titles to users based on user determined start times. Typically, a content provider streams video content to each user individually. A true video on demand (VOD) system assumes each customer can start a new video stream immediately upon request. This implies that every VOD request made at a different starting time needs a new unicast transport stream for the video content. Unfortunately, this results in a high network transport cost in terms of network bandwidth compared to a broadcast system. However, a study shows that with about 6 start times for a video stream bandwidth, a static broadcasting schedule for a VOD system can support a large number of customers with 20 seconds initial delay for a two hour movie. See, e.g., Ramaprabhu Janakiraman et al., "Fuzzycast: Efficient Video-on-Demand over Multicast", proceeding of InfoCom 2002, New York.

Therefore, a need exists for a system and method, which better utilizes resources to provide a true video on demand system.

SUMMARY OF THE INVENTION

When a personal video recorder (PVR) is available, a consumer device can record the future part of a requested video while simultaneously playing the current part of the video stream. This enables the reduction of the average transport bandwidth requirement when the number of consumers ordering the same video is relatively large. In the present invention, a system and method for broadcasting content includes a content provider which interfaces with one or more clients through a network. The content provider includes a scheduler responsive to requests for content from clients. The scheduler provides the content in blocks by making the blocks available to requesters by a plurality of streams wherein a subsequent requester accesses blocks from previous requester's streams complemented by a subset of blocks in a stream for the subsequent requester, to complete an entire set of blocks. In such a manner, each requester can playback the requested content continuously with an initial delay less than the block size.

A system for broadcasting content includes a content provider which interfaces with one or more clients through a network. The content provider includes a scheduler responsive to requests for content from one or more clients. The scheduler provides the content in blocks by making the blocks available to requesters by a plurality of streams wherein subsequent requesters access blocks from one or more previous requester's streams complemented by a subset of blocks from the subsequent requester's stream to complete an entire set of blocks for the subsequent requester.

The scheduler broadcasts in accordance with a schedule to transmit the entire set of blocks for a first requester and a schedule for a subset of blocks for each subsequent requester. The subset of blocks for a subsequent request may include blocks scheduled to transmit during an arrival interval between the subsequent request and a request immediately earlier than the subsequent request. The scheduler preferably schedules each block to be transmitted at a reference time of the block, starting from a time that a request is made. The reference time of a block may be the time the block must be transmitted for a continuous streaming minus the starting time of the streaming.

A method for broadcasting content includes interfacing with one or more clients through a network and dynamically scheduling content broadcastings, responsive to requests for content from one or more clients. The content is provided in blocks by making the blocks available to requesters by a plurality of streams wherein a subsequent requester accesses blocks from one or more previous requester's streams is complemented by a subset of blocks as a new stream for the subsequent requester to complete an entire set of blocks for the subsequent requester.

The step of dynamically scheduling may include scheduling for transmission, an entire set of blocks for a first requester and scheduling a subset of blocks for each subsequent requester. The scheduling for the first requester and each subsequent requester for each block is scheduled to be transmitted at a reference time of each block starting from a time a request is made. The reference time of a block may be the time the block must be transmitted for a continuous streaming minus the starting time of the streaming. The subset of blocks for a subsequent request may include blocks scheduled to transmit during an arrival interval between the request of the subsequent requester and a request immediately before the subsequent request. The step of dynamically scheduling includes scheduling a same content to a plurality of customers at different start times. A program storage device readable by machine, tangibly embodying a program of instructions executable by the machine may be implemented to perform the steps as recited herein.

BRIEF DESCRIPTION OF THE DRAWINGS

The teachings of the present invention can be readily understood by considering the following detailed description in conjunction with the accompanying drawings, in which.

Figure 1:
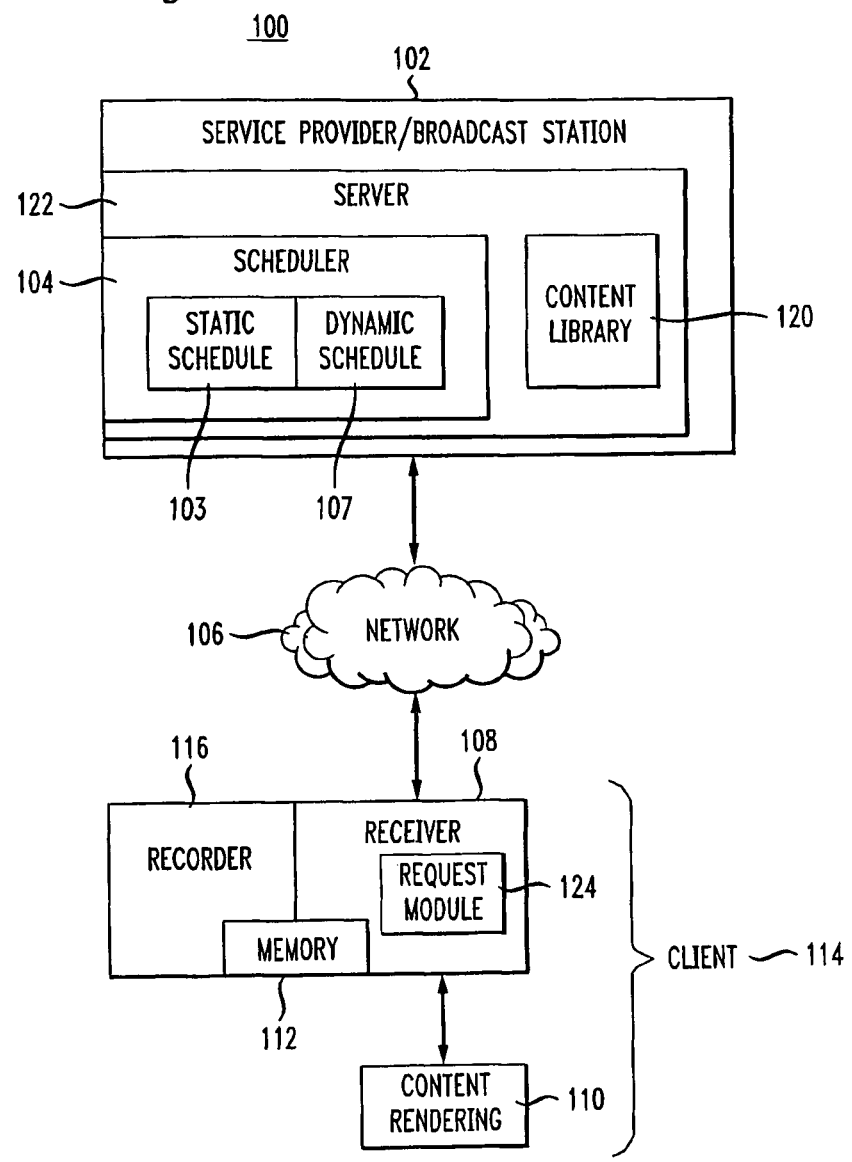
FIG. 1 depicts a high level block diagram of an on demand system with dynamic scheduling in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides systems and methods including at least a broadcasting schedule to support personal video recorder (PVR) enabled customers. Although the present invention will be described primarily within the context of a video on demand system, the present invention is much broader and may include any digital multimedia system, which is capable of content delivery over a network. In addition, the present invention is applicable to any playback method including data received by telephone, set top boxes, computer, satellite links, etc. Even further, although the present invention is described in terms of a cable or satellite network; however, the concepts of the present invention may be extended to other wireless and wired network types.

In embodiments of the present invention, with the store capability and broadcasting schedule based on dynamic customer requests, a VOD system in accordance with the present invention can support a number of VOD customers using a small fraction of the broadcasting bandwidth needed by a conventional VOD system. For example, to support 20 customers with random requests at different starting times, in a conventional VOD system using a unicasting scheme, the average bandwidth is linearly increased as a function of the number users and, in this case, 20*B bandwidth is needed, where B is the average bandwidth required for the demanded video. On the other hand, in a particularly useful embodiment of a VOD system in accordance with the present invention, on the average, less than 3*B is needed to support the same number of users for a true VOD experience. This represents an illustrative result and improved results are further contemplated.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

FIG. 1 depicts a high level block diagram of an on demand broadcasting system 100 with dynamic scheduling in accordance with one embodiment of the present invention. The broadcasting system 100 of FIG. 1 illustratively includes one or more broadcasting stations or service providers 102 which broadcast and/or deliver content to one or more clients 114 via a network 106. In the broadcasting system 100 of FIG. 1, the service provider 102 illustratively comprises a server 122, a content library 120, and a scheduler including a static schedule 103 and a dynamic schedule 107. The client 114 illustratively comprises a recording device (e.g., personal video recorder PVR)) 116, a memory 112, a content rendering device 110, a receiver 108 and request module 124. In the broadcasting system 100 of FIG. 1, the service provider 102 may include a television, radio, satellite, cable or any other network service providers with scheduled programs or dynamically selective programs for broadcasting/multicasting.

The present invention solves many problems associated with conventional systems. In one embodiment, the problem of providing content in a broadcasting environment to a number of consumers requesting the same video content is solved. Considering an example, such environment may have tens to a couple of hundred clients 114 using VOD service at a same time and probably only a dozen or so clients 114 will request the same video content. The network 106 can be employed to transmit the VOD content to the clients 114. Examples of the network 106 may include a cable network, DSL network, corporate local area network (LAN), wireless LAN, satellite, radio broadcast network, television broadcast network, or any other medium that can deliver on demand services including audio only services.

In accordance with the present invention, broadcasting of VOD is supported by personal video recorder (PVR) 116 enabled customers or clients 114. That is, the recorder 116 may comprise a buffer, a PVR, a VHS, a DVD recorder, a hard drive, a set top box or any other content storage device. The rendering device 110 may comprise a display (e.g., television, cellular telephone, monitor, etc.), a speaker, or any other appropriate content rendering device depending on the content. In various embodiments of the present invention, the rendering device 110 and receiver 108 can be integrated and can also be integrated with the recorder 116. While the receiver 108, device 110 and recorder 116 are able to be integrated into a single device, each may also be implemented as separate devices. For example, the device 110 may include a television set, the receiver 108 may include a set top box, and the recorder 116 may include a PVR or DVD recorder device.

A static schedule 103 is programmed into the scheduler 104 at the service provider 102. The static schedule 103 determines the content to be transmitted and transmits the content in blocks with different rates. For example, a first block needs to be transmitted every time slot and a second block needs to be transmitted every other time slot, and so on. At the client 114, the receiver 108 (with the memory 112) or the recorder 116 record future blocks while playing current blocks. However, with the static schedule 103, the amount of bandwidth needed is independent of the number of VOD requests. The static schedule 103 is employed in a single requester scenario or for a first requester as will be explained in further detail below.

The present invention, however, implements the dynamic broadcasting schedule 107 for providing a true VOD service with initial delay bounded by or limited to the block size, which uses less bandwidth when a number of customers is small and more bandwidth when the number is large, up to the bandwidth needed for use of the static broadcasting schedule 103 (times the number of users). The broadcasting schedule 107 of the present invention is truly reflective of the real-time status of VOD requests. One goal is to have each customer start to view the requested video content immediately upon request and play it back continuously.

Referring back to FIG. 1, the broadcasting system 100 broadcasts content from a content or service provider 102 which interfaces with one or more clients through network 106. The server(s) 122 of the content provider 102 perform client/network interfacing tasks and manage the content library 120, which includes a plurality of video, audio or other media titles for on demand selection and delivery to clients.

The scheduler 104 is responsive to requests for content from one or more clients 114. The scheduler 104 may be part of the servers 122 or comprise a separate component. The scheduler 104 provides content to the plurality of clients, which may include the same content being provided at different times. This is preferably preformed by making blocks of the content available to requesters by a plurality of streams wherein subsequent requesters access blocks from previous requester's streams complemented by resent missing blocks to complete an entire set of blocks for each requester.

For example, a first requester for content receives the entire set of blocks from the scheduler 104. Subsequent requesters receive the same blocks as the first requester concurrently with the first requester's stream. Each requester preferably receives their own stream of blocks concurrently (same blocks as first requester) from the point of request of that subsequent requester. Any missed blocks for the subsequent requesters are made up for from streams sent to previous requesters and/or resent blocks for the requester. The client may request missing blocks not received within a given period of time to supplement the blocks received to provide a complete set of blocks. The request module 124 in receiver 108 is provided to monitor the streams and ascertain which blocks have been received and which blocks are needed and to request (after an appropriate waiting period) any blocks not yet received but needed to provide a full set of blocks.

Advantageously, the system bandwidth (total bandwidth) is better utilized in accordance with the present invention. A number of clients receiving the entire set of blocks using the system bandwidth is much greater than a number of clients that would receive unicasted individual streams using the same bandwidth. The system may include a bandwidth for transmitting content to a number of clients that is one tenth or less times a number of bandwidth streams sent by the content provider. For example, less than 4 streams can service 40 or more customers.

Figure 2:
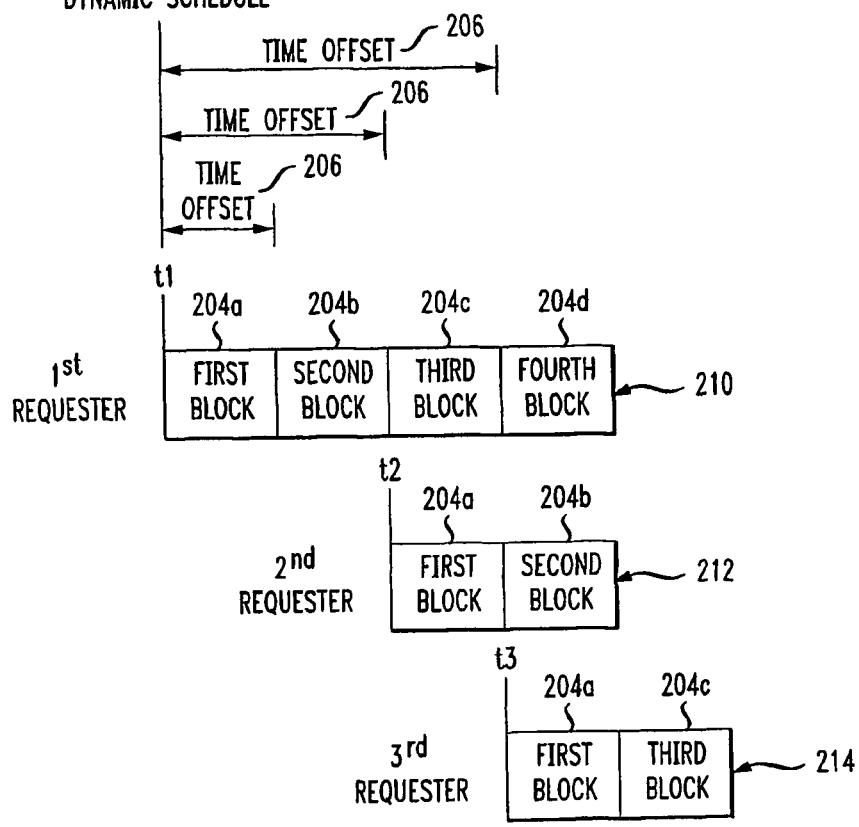
FIG. 2 depicts a high level block diagram of a dynamic broadcasting schedule of a video document divided into scheduling blocks suitable for use in the demand broadcasting system of FIG. 1 in accordance with an illustrative embodiment of the present invention.

FIG. 2 depicts a high level block diagram of a dynamic broadcasting schedule of a video document divided into scheduling blocks suitable for use in the demand broadcasting system 100 of FIG. 1 in accordance with an illustrative embodiment of the present invention. Referring to FIG. 2 with continued reference to FIG. 1, the video document is logically divided into illustratively four blocks 204a, 204b, 204c and 204d. Each block 204 includes a multiple number of video frames. Although four blocks 204a, 204b, 204c and 204d are depicted in FIG. 2, the content may include more or less blocks.

The dynamic broadcasting schedule 107 of FIG. 2 transmits a first block 204a of the video immediately after a VOD request is received and transmits consecutive blocks no later than their time offset 206 from the first block 204a. To achieve this, the broadcasting scheduler 104 functions in the following manner for a video having N blocks. The first block 204a has a reference time of zero and every other block has a reference time equal to a playback time offset 206 from the first block 204a. For the very first request 210 from a user, the broadcasting scheduler 104 is set to transmit all N blocks (e.g., 204 a-d) consecutively, as in a conventional VOD system starting at $t_1$, the arrival time of the first request.

Upon receipt of a second request 212 at time t2, the second requester receives the continuing content 210 of the first request, but needs to make up for the lost blocks 204a and 204b which were missed. These blocks are resent or rescheduled by the scheduler 104. Upon receipt of a third request 214 at time t3, the third requester receives the continuing content 210 of the first request and the resent content 212 of the second request. Advantageously, only blocks 204a and 204c are needed since the fourth block 204d is available through the content 210 and the second block 204b is available through content 212. The first block 204a and the second block 204c may be made up for by newly started up content streams for the same content or retransmitted to make up the lost blocks at a later time by scheduler 104. The subset of blocks for a subsequent request includes blocks scheduled to transmit during an arrival interval between the subsequent request and a request immediately earlier than the subsequent request. The broadcasting scheduler 104 schedules each block to be transmitted at a reference time of the block, starting from a time that a request is made. The reference time of a block may include the time the block must be transmitted for a continuous streaming minus the starting time of the streaming.

Figure 3:
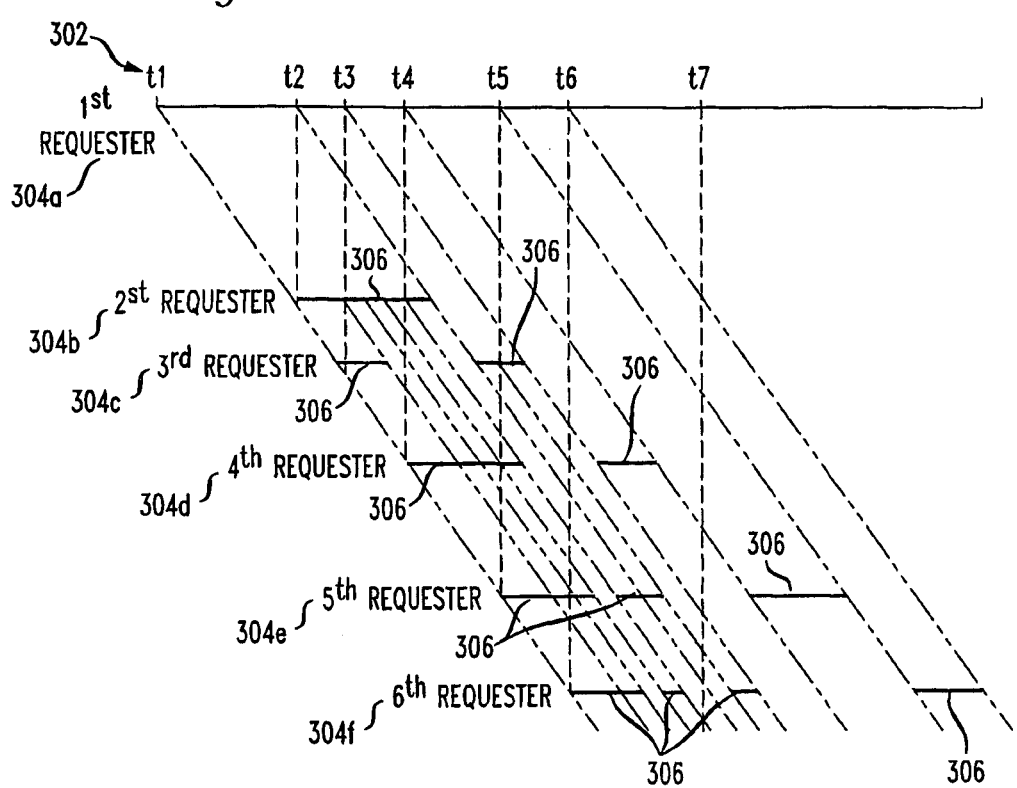
FIG. 3 depicts a timing diagram illustrating the scheduling of content needed to be retransmitted in an environment where six requesters request the same content at different times in accordance with an illustrative embodiment of the present invention.

FIG. 3 depicts a timing diagram illustrating the scheduling of content needed to be retransmitted in an environment where six requesters request the same content at different times in accordance with an illustrative embodiment of the present invention. Referring to FIG. 3, a time line 302 depicts times ($t_s$) for start or request times of a plurality of requesters 304a-f (illustratively six requesters of content). Horizontal lines 306 depict content that needs to be retransmitted (was missed) as a result of a later starting time from $t_1$. That is, the horizontal lines 306 represent times when rebroadcast blocks are sent as a result of requesters missing blocks. Advantageously, since many of the missed blocks are being rebroadcast or otherwise are made available as a result of earlier requester's data streams, the bandwidth available is increased despite a larger number of requesters. This can be seen in FIG. 3 by the relatively small length of lines 306 for each requester.

For example, suppose the request from a kth user has been scheduled already. For the (k+1)th request, the scheduler is set to transmit those missing blocks that have been transmitted in inter-arrival period between the kth request and the (k+1)th request (e.g. in the time duration $[t_k, t_{k+1}]$). Although the missing blocks can be transmitted anytime after $t_{k+1}$, the best time to transmit a block for bandwidth efficiency is at its reference time starting from the arrival time of the (k+1)th request, $t_{k+1}$. The reference time of the ith block is (i−1) $T_{blocksize}$, assuming all blocks have equal size. The blocks transmitted in $[t_k, t_{k+1}]$ (call this set $P_{k+1}$) are only blocks received by the client of the kth request up to $t_{k+1}$. All other blocks for the kth request will be available after $t_{k+1}$, therefore they can be received by both clients of the kth and (k+1)th requests. For the (k+1)th request, all blocks except of set $P_{k+1}$ have been scheduled already to be transmitted after $t_{k+1}$ for previous requests already.

Blocks in set $P_{k+1}$ are scheduled to be transmitted as late as possible, e.g. at the reference time of the block to $t_{k+1}$. This can increase the probability of reception by other clients of succeeding requests. For example, a $4^{th}$ request for a same movie is requested by a user at time $t_4$. The $4^{th}$ request has missed the content transmitted between $t_1$ and $t_4$; however, some of this content is being resent for previous requesters, e.g., for the second request and the $3^{rd}$ request. The second requester needs the content between $t_1$ and $t_2$ and the third requester needs the content between $t_1$ and $t_3$. The third requester can pick up some of the content missed from the rebroadcasting of the between $t_2$ and $t_1$, and the $4^{th}$ requester can pick up some of the rebroadcast content between $t_1$-$t_2$, and/or $t_2$-$t_3$ or $t_1$-$t_3$. Any content missed may be rebroadcast for another request later on but as soon as practicable to ensure that each request can begin as earlier as possible.

For example, suppose the request from a $3^{rd}$ user has been scheduled already. For the $4^{th}$ request, the scheduler is set to transmit those blocks that have been transmitted in the inter-arrival period between the 3$^{rd}$ request and the 4$^{th}$ request, e.g. in the time duration [t$_3$, t$_4$]. Each block will be transmitted at its reference time from the arrival time of the 4$^{th}$ request, t$_4$. The blocks transmitted in [t$_3$, t$_4$] (set P$_4$) are only blocks received by the client of the 3rd request up to t$_4$. All other blocks will be available after t$_4$, so that these blocks can be received by the clients of the 3$^{rd}$ and 4$^{th}$ requests. For the 4$^{th}$ request, all blocks except of set P$_4$ have been scheduled already to be transmitted after t$_4$ for previous requests already. Blocks in set P$_4$ are scheduled to be transmitted as late as possible, e.g. at the reference time of the block to t$_4$. This can increase the probability of reception by other clients of succeeding requests. The content streams may occupy a plurality of different channels each carrying a different content stream. In addition or alternatively, the streams may be multiplexed or interleaved to provide preferred block sequencing to reduce or eliminate start time delays in the event of a large number of requesters.

Figure 4:
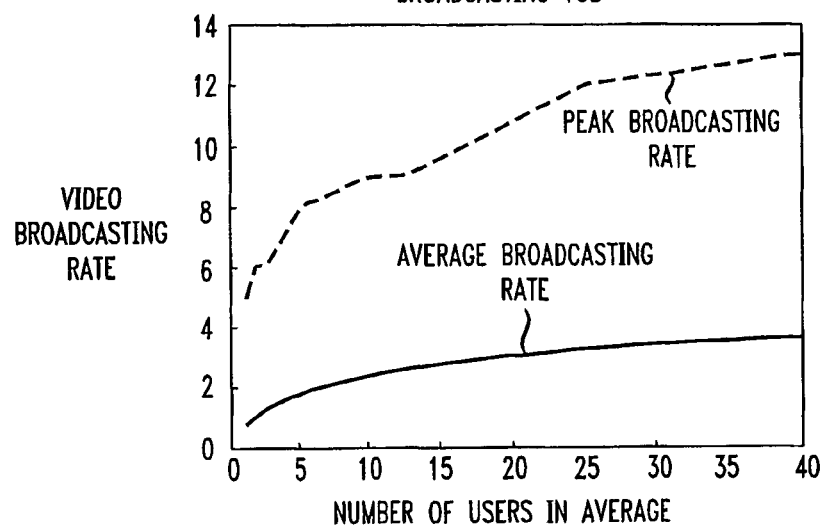
FIG. 4 depicts a plot of simulation results for a video broadcasting rate versus a number of users for instant video on demand service in accordance with an illustrative embodiment of the present invention.

FIG. 4 depicts a plot of simulation results for a video broadcasting rate versus a number of users for instant video on demand service in accordance with an illustrative embodiment of the present invention. Referring to FIG. 4, a simulation run by the inventors was configured as follows. A video stream was segmented into N blocks, N=10000. For a 120 minute movie, one block was 0.72 seconds long. The request arrivals obeyed a Possion distribution. In the simulation, the average inter-arrival time was varied from 250 blocks to 10000 blocks, equivalently, simulating the average number of customers requesting a same video content was from 1 to 40 requesters. As depicted in FIG. 4, the average broadcasting rate is low in terms of the number users. The scheduler is dynamic and so is the bandwidth requirement. When the average user number is 1, the average broadcasting rate is only 0.7 times of video streaming rate. It is even less than one broadcasting stream because the customer requests are randomly arrived. Their playback period can be overlapped randomly so some times there may be no users at certain time slots. When the user number is 40, the average broadcasting rate is only 3.7 times of the video streaming rate. When the number of users is as large as 500 (not shown in the figure), it was calculated that the average rate is 5.94 and the peak rate was 18. The peak broadcasting rate reflects the burstiness of the broadcasting traffic for one video content. This can restrict the peak rate by scheduling some blocks earlier, however, it will increase the average rate because the number clients sharing those blocks becomes smaller, or equivalently increases the initial delay and buffer size.

Figure 5:
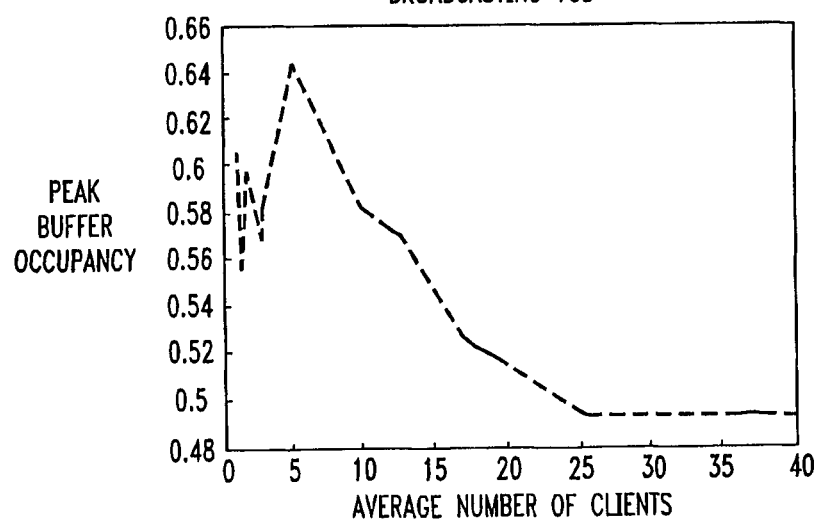
FIG. 5 depicts a plot of simulation results for buffer occupancy versus an average number of users for video on demand service in accordance with an illustrative embodiment of the present invention.

Another result to be noted is the buffer occupancy, how much storage capacity a client PVR should have in order to use the true VOD with broadcasting schedule. FIG. 5 depicts a plot of simulation results for buffer occupancy versus an average number of users for video on demand service in accordance with an illustrative embodiment of the present invention. Referring to FIG. 5, simulation results are illustratively depicted showing an amount of buffer capacity used versus the number of clients. A maximum storage for a PVR is illustratively shown to be about 65% of video length. This converges to less than 50% as number of clients grows. The buffer occupancy is show that clients store a lot of the future parts of the video stream. This is due in part to the fact that the missing parts of the video stream are generally toward the beginning of the video stream.

Figure 6:
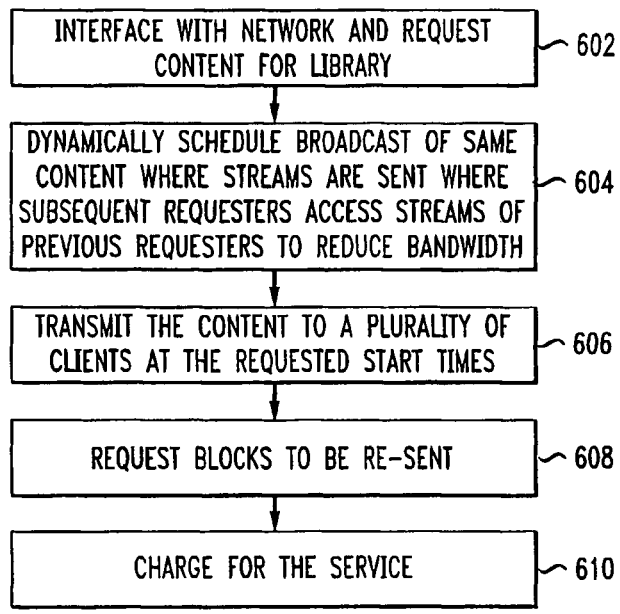
FIG. 6 depicts a flow diagram of a method for broadcasting content including dynamic scheduling in accordance with one embodiment of the present invention.

FIG. 6 depicts a flow diagram of a method for broadcasting content including dynamic scheduling in accordance with one embodiment of the present invention. The method of FIG. 6 may by implemented by a program storage device readable by machine, tangibly embodying a program of instructions executable by the machine to perform method steps.

The method of FIG. 6 begins in block 602 where one or more clients interface with the content provider through a network. The users or requesters, request content from the content library of the content provider. In block 604, content broadcastings are dynamically scheduled, responsive to requests for content from one or more clients. The content is provided in blocks by making the blocks available to requesters by a plurality of streams wherein subsequent requesters access blocks from previous requester's streams complemented by resent blocks to complete an entire set of blocks for each requester. The step of dynamically scheduling includes scheduling a same content to a plurality of customers at different start times. This step also preferably includes sending the entire set of blocks to a first requester such that subsequent requesters receive the same blocks as the first requester concurrently with the first requester's stream wherein any missed blocks for the subsequent requesters are made up from streams sent to previous requesters and/or resent blocks for the requester.

In block 606, the content is transmitted to a number of clients. With the benefit of reduced bandwidth requirements. A buffer delay of less than one block time is preferred. In block 608, after a given amount of time or when a block is needed for rendering, a client can request a block or blocks to be resent. The scheduler can determine when the blocks will be available and send this information to the client or may send the blocks needed by the client. The clients are charged for the service in block 610.

Figure 7:
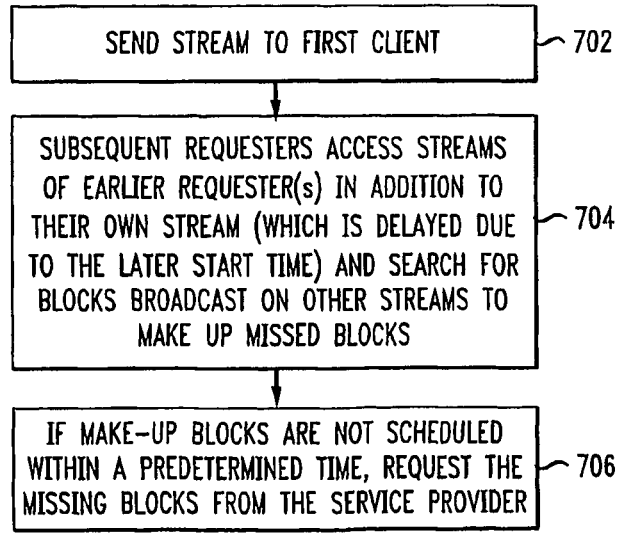
FIG. 7 depicts a flow diagram of a method for dynamic scheduling suitable for use in the method for broadcasting of FIG. 6 in accordance with an embodiment of the present invention.

FIG. 7 depicts a flow diagram of a method for dynamic scheduling suitable for use in the method for broadcasting of FIG. 6 in accordance with an embodiment of the present invention. The method of FIG. 7 begins in block 702, where a content stream is sent to a first requester. This is statically scheduled. In block 704, future or subsequent requesters receive the sequential stream of an earlier requester (e.g., the first requester or a statically scheduled requester) and search for blocks broadcast on other streams to other requesters to make up for any missed blocks to complete the content document or file.

In block 706, if make-up blocks are not scheduled within a predetermined time, the missing blocks may be requested by the clients from the service provider. These blocks may be directly sent or scheduled to be sent by moving them up in the schedule queue.

Having described preferred embodiments for systems and methods for content broadcasting having at least a dynamic broadcasting schedule (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A system for broadcasting content, comprising:
   at least one client with one or more processors;
   a network;
   a content provider which interfaces with the at least one client with the one or more processors through the network and the content provider including a scheduler for providing content to requesting clients in a plurality of streams, wherein each subsequently requesting client issuing a subsequent request accesses blocks from at least one stream of a previously requesting client and searches for blocks broadcast on the at least one stream of the previously requesting client to make-up for missing blocks, which are complemented by a subset of blocks for the subsequent requester to complete an entire set of blocks for the subsequent requester, the subset of blocks for the subsequent requester including blocks scheduled to transmit and transmitted during an arrival interval between the subsequent request and a request immediately prior to the subsequent request and if the make-up for the missing blocks from the previously requesting client are not scheduled within a predetermined time, then requesting the make-up for the missing blocks from the content provider, wherein a transmission of blocks of the complementary subset are delayed until a first reference time associated with the subsequent request to increase a probability of reception by clients of succeeding requests, wherein the scheduler broadcasts in accordance with a schedule to transmit the entire set of blocks for a first requester and a schedule for the subset of blocks for each subsequent requester, wherein the subset of blocks for a subsequent request includes blocks scheduled to transmit during an arrival interval between the subsequent request and a request immediately earlier than the subsequent request, wherein the scheduler schedules each block to be transmitted at a second reference time of the block, starting from a time that a request is made, and wherein the second reference time of the block is the time the block must be transmitted for a continuous streaming minus the starting time of the streaming.

2. The system as recited in claim 1, wherein the network includes at least one of a cable network, a satellite network, a television network, a radio network, a telephone network and a DSL network.

3. The system as recited in claim 1, wherein the system includes a video on demand system and the content includes video.

4. A video on demand system for broadcasting content, comprising:

a network;

a content provider which interfaces with one or more clients through the network;

a content library of video content selectable by clients over the network;

a scheduler responsive to requests for the video content from one or more clients, the scheduler providing a same video content to a plurality of clients at different times by making block portions of the video content available to requesters by a plurality of streams wherein a subsequent requester issuing a subsequent request accesses blocks from one or more previous requester's streams and searches for blocks broadcast on the at least one stream of the previously requesting client to make-up for missing blocks complemented by a subset of blocks as a new stream for the subsequent requester to complete an entire set of blocks for the subsequent requester, the subset of blocks for the subsequent requester including blocks scheduled to transmit and transmitted during an arrival interval between the subsequent request and a request immediately prior to the subsequent request and if the make-up for the missing blocks from the previously requesting client are not scheduled within a predetermined time, then requesting the make-up for the missing blocks from the content provider, wherein a transmission of blocks of the complementary subset are delayed until a first reference time associated with the subsequent request to increase a probability of reception by other clients of succeeding requests, wherein the scheduler broadcasts in accordance with a schedule to transmit the entire set of blocks for a first requester and a schedule for the subset of blocks for each subsequent requester, wherein the subset of blocks for a subsequent request includes blocks scheduled to transmit during an arrival interval between the subsequent request and a request immediately earlier than the subsequent request, wherein the scheduler schedules each block to be transmitted at a second reference time of the block, starting from a time that a request is made, and wherein the second reference time of the block is the time the block must be transmitted for a continuous streaming minus the starting time of the streaming.

5. The system as recited in claim 4, wherein the network includes one of a cable network, a satellite network, a television network, a telephone network or a DSL network.

6. The system as recited in claim 4, wherein the client includes a receiver which determines which blocks are needed and requests these blocks if the blocks have not been supplied in a given time period.

7. A method for broadcasting content comprising the steps of:

interfacing with one or more clients through a network; and dynamically scheduling content broadcastings responsive to requests for content from one or more clients, wherein the content is provided in blocks by making the blocks available to requesters by a plurality of streams wherein a subsequent requester issuing a subsequent request accesses blocks from one or more previous requester's streams and searches for blocks broadcast on the at least one stream of the previously requesting client to make-up for missing blocks complemented by a subset of blocks as a new stream for the subsequent requester to complete an entire set of blocks for the subsequent requester, the subset of blocks for the subsequent requester including blocks scheduled to transmit and transmitted during an arrival interval between the subsequent request and a request immediately prior to the subsequent request and if the make-up for the missing blocks from the previously requesting client are not scheduled within a predetermined time, then requesting the make-up for the missing blocks from the content provider, wherein a transmission of blocks of the complementary subset are delayed until a first reference time associated with the subsequent request to increase a probability of reception by other clients of succeeding requests, wherein the scheduler broadcasts in accordance with a schedule to transmit the entire set of blocks for a first requester and a schedule for the subset of blocks for each subsequent requester, wherein the subset of blocks for a subsequent request includes blocks scheduled to transmit during an arrival interval between the subsequent request and a request immediately earlier than the subsequent request, wherein the scheduler schedules each block to be transmitted at a second reference time of the block, starting from a time that a request is made, and wherein the second reference time of the block is the time the block must be transmitted for a continuous streaming minus the starting time of the streaming.

8. The method as recited in claim 7, wherein the network includes one of a cable network, a satellite network, a television network, a radio network, a telephone network or a DSL network.

9. The method as recited in claim 7, wherein the step of dynamically scheduling includes scheduling video content for a video on demand system.

10. The method as recited in claim 7, wherein the step of dynamically scheduling includes scheduling a same content to a plurality of customers at different start times.

* * * * *